Feb. 12, 1963     E. D. RAPISARDA     3,077,289
BLENDING TYPE LIQUID DISPENSING UNIT
Filed March 6, 1961     9 Sheets-Sheet 1

INVENTOR.
EDWARD D. RAPISARDA
BY Chapin & Neal
ATTORNEYS

Feb. 12, 1963 E. D. RAPISARDA 3,077,289
BLENDING TYPE LIQUID DISPENSING UNIT
Filed March 6, 1961 9 Sheets-Sheet 3

INVENTOR.
EDWARD D. RAPISARDA
BY Chapin & Neal
ATTORNEYS

Feb. 12, 1963   E. D. RAPISARDA   3,077,289
BLENDING TYPE LIQUID DISPENSING UNIT
Filed March 6, 1961   9 Sheets-Sheet 8

INVENTOR.
EDWARD D. RAPISARDA
BY Chapin & Neal
ATTORNEYS

Feb. 12, 1963 E. D. RAPISARDA 3,077,289
BLENDING TYPE LIQUID DISPENSING UNIT
Filed March 6, 1961 9 Sheets-Sheet 9

INVENTOR.
EDWARD D. RAPISARDA
BY Chapin & Neal
ATTORNEYS

United States Patent Office
3,077,289
Patented Feb. 12, 1963

3,077,289
BLENDING TYPE LIQUID DISPENSING UNIT
Edward D. Rapisarda, West Springfield, Mass., assignor to Gilbert & Barker Manufacturing Company, Springfield, Mass., a corporation of Massachusetts
Filed Mar. 6, 1961, Ser. No. 93,419
15 Claims. (Cl. 222—26)

The present invention relates to improvements in liquid dispensing units adapted to deliver a selected blend or mixture of a plurality of liquids.

Liquid blending apparatus has been developed in recent years to utilize a single unit for selectively dispensing one or the other of two separate grades of liquid, such as "regular" or "premium" gasoline, and at a customer's option to dispense a selected blend of the two grades. Dispensing units have also been developed to dispense a single grade of gasoline together with predetermined proportions of oil additive for a selected mixture of oil and gasoline.

An object of the invention is to provide a simplified mechanism for such types of blending dispenser pumps and more particularly to simplify grade selector and variator adjustment mechanism and interlocking means for pump operation.

A more specific object is to provide an improved blender with a single manual control to select a grade of liquid for delivery and at the same time adjust the price computer to indicate the cost of liquid products dispensed.

The present inventive concepts are broadly characterized by the combination of a register to indicate the total cost of product delivered, a variator with an output having a true adjustment for driving the register, cost wheels, and metering means with a single output driving the variator. Grade selector means are also provided and include a single member to control the grade of liquid. As herein used grade denotes any given liquid product capable of being dispensed by the unit. It may be a mix or blend of two or more types or grades of liquid, or a single type or grade of liquid. A single manual operating handle actuates the variator and grade selector means for setting the unit to dispense any desired grade of liquid and to compute the total cost of a delivery.

A particular feature of the invention is the provision of means permitting a wide choice of incremental price differentials between various grades of liquid. Likewise the grades may be established as any desired proportions of two different types of liquid. Further, simplified mechanism enables a price change without altering previously established price differentials between grades. Also, if desired, the price of the lowest grade of liquid can be readily changed without changing prices previously established for higher quality grades.

A further object is to provide improved liquid blending mechanism responsive to a single adjusting member to control the proportions of liquids in a given grade and particularly adapted for use in the delivery of selected grades of different types of gasoline.

Yet another object is to provide other improved liquid blending mechanism responsive to a single adjusting member to control the proportions of different liquids in a given grade, and particularly adapted for use in the delivery of gasoline and oil additive.

The above and other related objects and features of invention will be apparent from the following description and the accompanying drawings.

Figure 1:
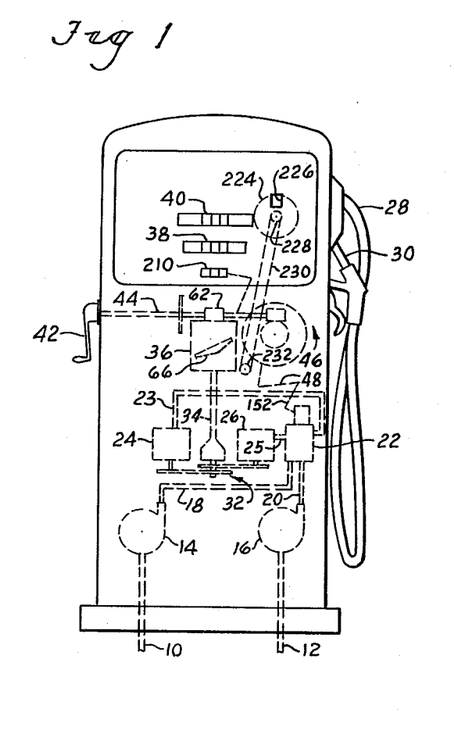
FIG. 1 is an elevation diagrammatically showing a liquid dispensing apparatus embodying the present invention which is particularly suited for the delivery of selected grades of liquid comprising blends of different types of gasoline.

A liquid dispensing unit of the type herein referred to is illustrated in FIG. 1. This dispensing unit is adapted to deliver regular or premium gasoline or any one of several grades comprising blends of various proportions of these two gasolines.

Pipes 10 and 12 respectively extend to supply tanks (not shown) of premium and regular gasoline respectively. Pumps 14 and 16 pressurize the regular and premium gasolines for flow through pipes 18 and 20 leading to a blending device 22 which controls the amount of each type of gasoline passing therethrough. Separate lines 23, 25 carry the regular and premium gasolines from the device 22 to flow meters 24 and 26, respectively. From these meters the gasolines are then carried, by pipes not shown, to a delivery hose 28 of known design having two separate passageways therethrough. A nozzle 30 is secured to the end of the hose 28 and is arranged to discharge the gasolines in the usual fashion for a blending dispenser.

The outputs of the meters 24 and 26 are added by integrated means 32. The output shaft 34 of the integrating means 32 drives a variator 36 which is preferably of the type disclosed in my copending application Serial No. 850,896, filed November 4, 1959.

The variator 36 and register wheels 38 are driven at a rate reflecting the total volume of gasoline dispensed. Register wheels 40 are driven from the variator 36 to indicate the total cost of the gasoline dispensed.

An operating handle 42 is disposed at one side of the dispensing unit and adapted to rotate a shaft 44 to adjust a grade selecting device 46 and simultaneously to adjust the variator 36 so that its output for driving the register wheels 40 will reflect the price of the grade of gasoline selected. The grade selecting device 46 comprises a control member in the form of a crank arm 48 which is linked to the blending device 22 to adjust the latter as is necessary to control the flow of regular and premium gasolines to establish the proportions for the desired grade to be delivered. By using the single operating handle 42, the variator 36 will be adjusted whenever the blend selecting means are operated so that the variator will always compute the cost of the selected grade.

Figure 3:
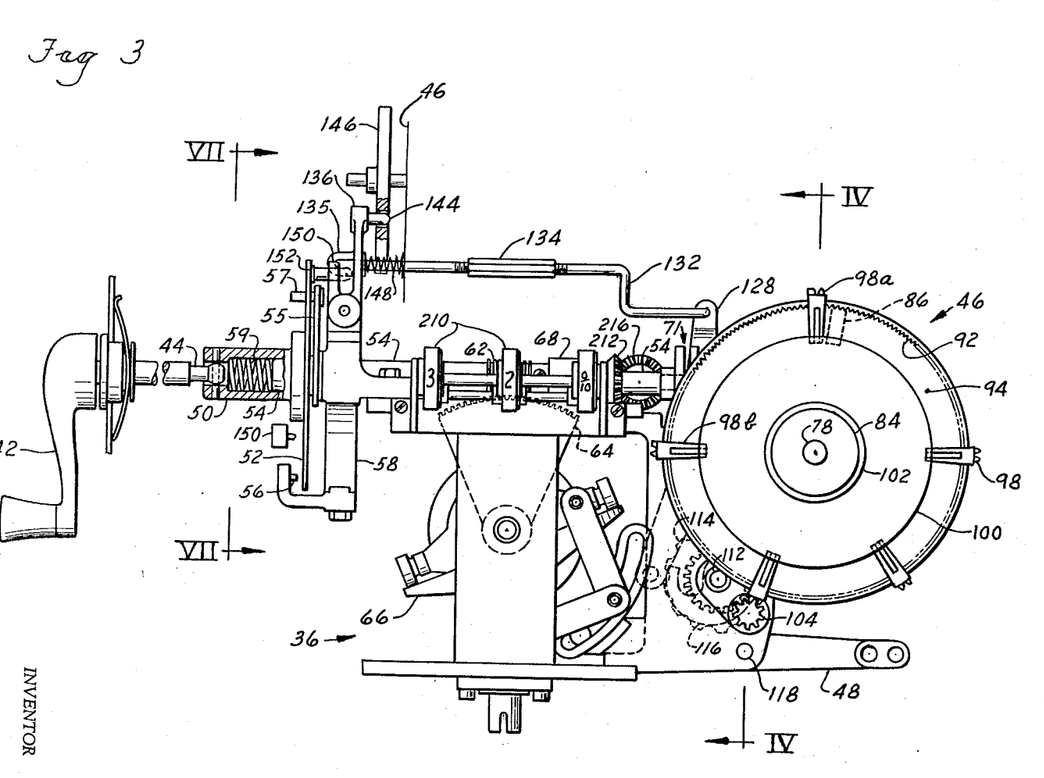
FIG. 3 is an elevation of mechanism for selecting the blend of liquid to be delivered and adjusting a variator accordingly.

Reference is next made to FIG. 3 for a more detailed description of the mechanism operated by the handle 42. The shaft 44 is connected to the hub 50 of an index plate 52 (see also FIG. 7). The hub 50 is telescoped over the end of a shaft 54. A lever 55 projects from the shaft 54 and a pin 57 enters a hole in the disk 52 to provide a driving connection between the shafts 44 and 54 and at the same time permitting the shaft 44 to be shifted axially against the action of spring 59. A pin 56 is mounted on a bracket arm 58 and arranged to enter one of a series of holes 60 (FIG. 7) formed in the plate 52 to provide for rotation of the shaft 54 in predetermined increments. In FIG. 3 the plate 52 is shown in displaced position to permit rotation of the shafts 44 and 54.

A worm 62 is secured to the shaft 54 and engages a worm gear segment 64 which is arranged to vary the angle of tilt of an annular ring 66 in the variator 36. The angular position of the ring 66 determines the rate of the output drive of the variator 36 and the rate at which the register wheels 40 will be driven. Means hereinafter described, prevent operation of the dispensing unit unless the plate 52 is rotated so that the pin 56 is received by one of the holes 60. The shaft 54 must therefore be in one of a plurality of predetermined angular positions wherein the angle of tilt of the ring 66 will cause the register wheels to rotate at an even tenth of a cent in computing the cost of gasoline dispensed, for example, the price computation would be at 32.90¢ or 33.50¢ per gallon. The mode of operation of the variator 36 is more fully described in my above-mentioned application and reference is made thereto for further constructional details of the preferred form of variator having an adjustable output drive. It is, however, important to note that the variator 36 provides a meter-driven variable speed drive for the register wheels 40 and that the rate of this variable speed drive may be adjusted by rotative movement by the operating handle 42, as is preferred.

Figure 6:
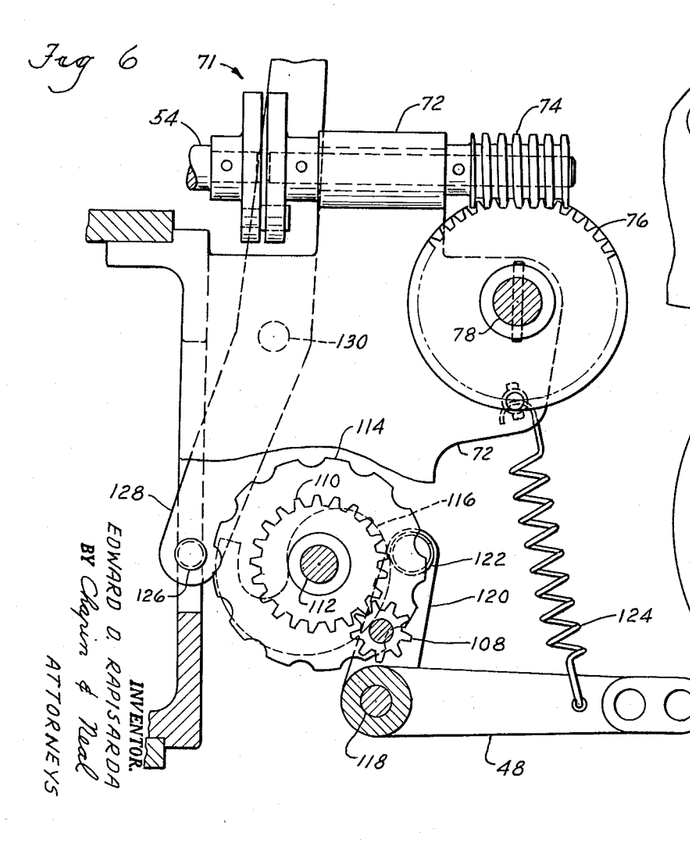
FIG. 6 is a section taken on line VI—VI in FIG. 4.

The shaft 54 is journaled at one end in the bracket 58 and at its other end in a bearing 68. The outer end of the shaft 54 is connected to a shaft 70 by a universal coupling 71. The shaft 70 is journaled in a bracket 72 and has a worm 74 (FIGS. 4 and 6) secured thereto for operating the grade selector 46.

Various elements of the grade selector device 46 are mounted on the bracket 72 and are controlled by rotation of the shaft 70 as will be apparent from the following description, having reference to FIGS. 3, 4, 5 and 6.

The worm 74 meshes with a worm gear 76 which is pinned to a shaft 78. The shaft 78 is also journaled in the bracket 72, and has a disk 80 keyed thereon. The disk 80 has an elongated hub 82 which is engaged by a nut 84 threaded onto the end of the shaft 78 to secure the disk 80 against the hub of gear 76. A serrated segment 86 (FIGS. 4 and 5) is secured to the disk 80 by a screw 88 and accurately located thereon by the illustrated dowels in fixed relation to price indicating indicia 90 on the periphery of the disk 80. A rim 92 is formed with the internal serrations which mesh with the serrations on the lug 86. A plate 94 is slidingly mounted on the hub 82 and also has serrations which mesh with the serrations formed on the rim 92. It will be seen that the plate 94 positions the rim 92 concentrically of the shaft 78 while the lug 86 accurately positions the rim in an angular sense relative thereto and also relative to the indicia 90 on the disk 80. A bench mark 96 is provided on the rim 92 to be matched against the indicia 90 to indicate the unit price of the lowest priced grade of liquid to be delivered from the dispensing apparatus as will be further developed hereinafter.

Figures 4, 5:
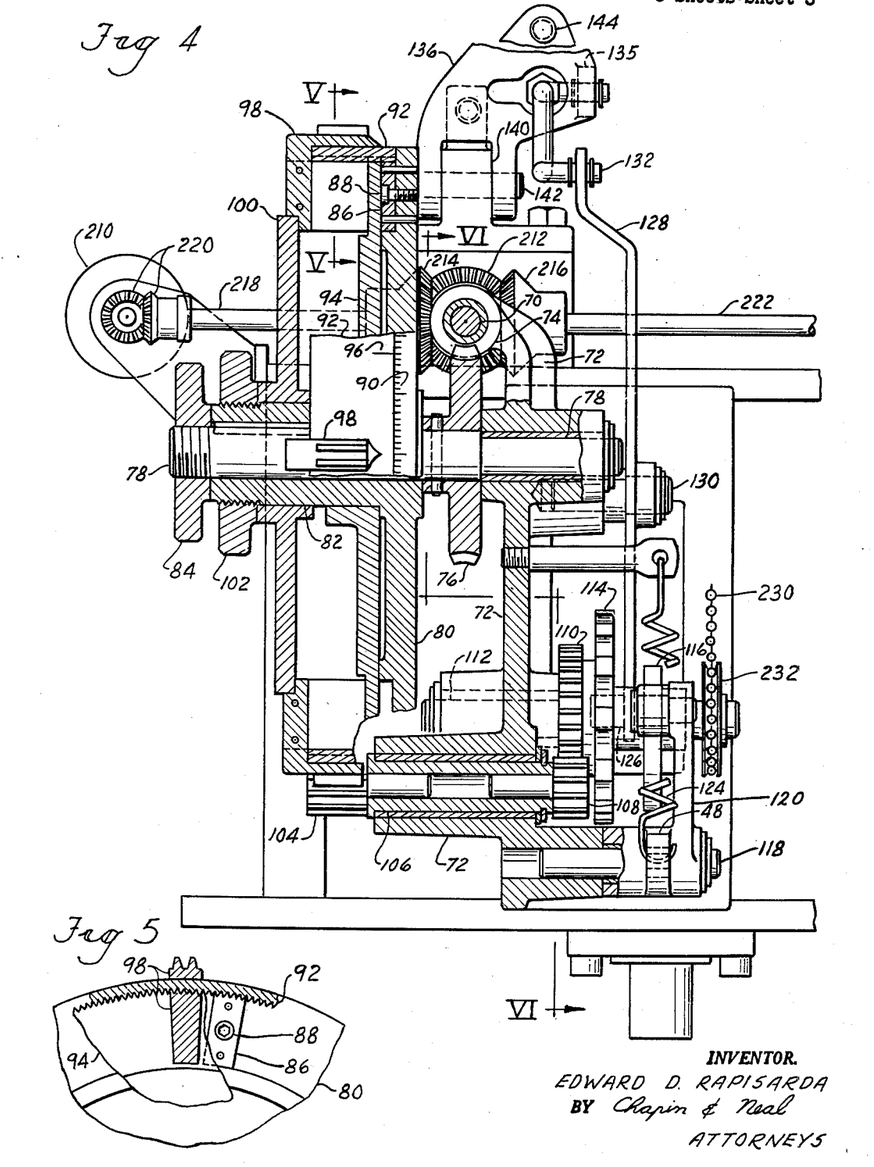
FIG. 4 is a section, on an enlarged scale, taken on line IV—IV in FIG. 3.
FIG. 5 is a section taken on line V—V in FIG. 4.

A series of indexing dogs 98 are angularly spaced about the rim 92 and each is held thereon by a clamping plate 100. The dogs 98 each comprise two portions; one portion has serrations which mesh with the serrations formed internally of the rim 92, and the other portion has gear teeth segments projecting from the rim. The clamp plate 100 is held against the dogs 98 by a nut 102 threaded onto the hub 82.

As the shaft 78 is rotated, the teeth segments of the dogs 98 successively mesh with a pinion 104 which has a stem that is press fitted into a sleeve 106. The sleeve 106 is journaled on the bracket 72 and receives the stem of a second pinion 108 also press fitted therein. The pinion 108 meshes with a gear 110 (FIGS. 4 and 6) which is secured to a shaft 112 also journaled on the bracket 72. An index wheel 114 and a spiral cam 116 are both secured to the shaft 112.

It is thus apparent that rotation of the shaft 70 by the manual lever 42 will result in continuous rotation of the shaft 78 and interrupted rotation of the shaft 112 as the spaced dogs 98 engage the pinion 104.

The crank arm 48 is pivotally mounted on a pin 118 which projects from the bracket 72. A second arm 120 is formed integrally with the arm 48. A roller 122 is carried by the arm 120 and held in engagement with the spiral cam 116 by a spring 124.

The index wheel 114 has a series of notches spaced around its periphery which are adapted to receive a roller 126 carried by a lever 128. The lever 128 is pivotally mounted on a pin 130, also projecting from the bracket 72. The arm 128 extends upwardly and receives at its upper end a link 132 (FIGS. 3 and 4). The link 132 has a turnbuckle 134 intermediate its ends for adjusting its effective length.

Figure 7:
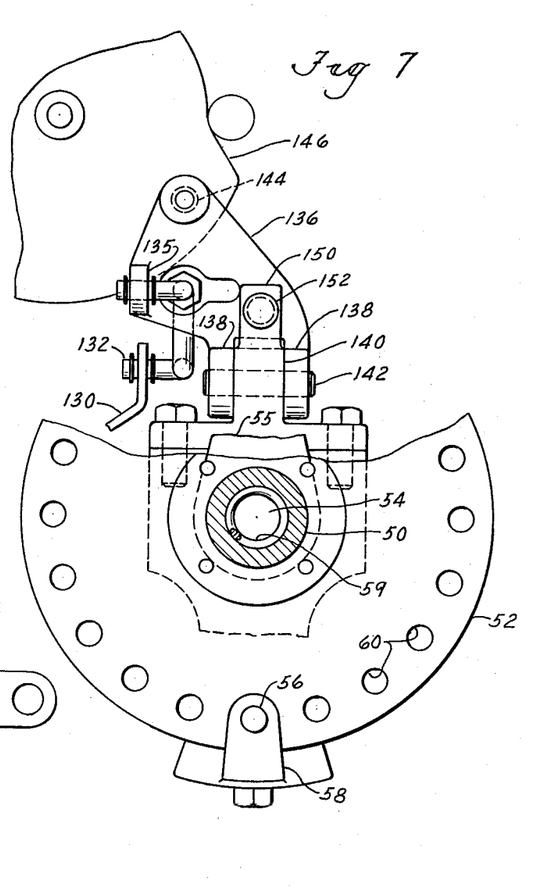
FIG. 7 is a section, on an enlarged scale, taken generally on line VII—VII in FIG. 3.

The opposite end of the link 132 is received by a lug 135 projecting from a bracket 136 (FIGS. 3 and 7). The bracket 136 has a pair of ears 138 which straddle a lug 140 and receive a pin 142 to provide for pivotal mounting of the bracket 136. The bracket 136 carries a pin 144 which is arranged to project into a hole formed in cam plate 146. Cam plate 146 is part of the operating mechanism of the register designed for use in this unit and having register wheels 38 and 40, above-referred to. This register is an automatic reset type of register sold by Veeder-Root Company of Hartford, Connecticut, and designated as Model No. 56. As will be recognized in the art cam plate 146, shown in its position after completion of a sale, must be rotated so as to reset the whels to zero, before gasoline can again be delivered. Otherwise the usual reset interlock prevents a pump operation.

A spring 148 is coiled about the link 132 and is captured between the wall of the register and the bracket 136 and urges the pin 144 away from the cam plate 146. It will also be seen that a finger 150 projects above the lug 140 and provides a sliding bearing for a pin 152 which is engaged at one end by the disk 52 and at the other end by the bracket 136.

The interlock mechanism described is effective to prevent operation of the dispensing unit unless the handle 42 has been rotated the proper amount to bring the grade selecting device 46 to the precise position necessary for the delivery of a selected grade of gasoline, and also to bring the disk 52 to the precise position necessary to tilt the ring 66 to compute the exact price selected for the given grade of gasoline. When the handle 42 is so rotated to reach such an exact position, one of the dogs 98 will be in full mesh with the pinion 104. The roll 126 will be fully seated in one of the notches in the index wheel 114 under the urging of spring 148. The pin 144 will be displaced clear of the cam plate 146 and one of the holes 60 in the disk 52 will be received by the pin 56.

If the handle 42 is not rotated to such an exact position then, of course, the lever 128 and link 132 will be displaced by the index disk 114 so that pin 144 will prevent rotation of the cam 146 and thereby prevent operation of the dispensing unit. Further, if rotation of the handle 42 has not brought the proper hole 60 (in disk 52) into registration with the pin 56 then the disk 52 will abut the pin 56 and fail to close a switch 150 (FIG. 3) which is connected in series in the electrical circuit for actuating the gasoline pumps 14 and 16.

The described means enable the use of a single operating handle to adjust the control arm 48 and thereby set the blending device 22 to deliver the predetermined proportions of regular and premium gasolines in the selected grade and simultaneously to adjust the variator 36 to compute the established price for the selected grade of gasoline.

Figures 8, 9:
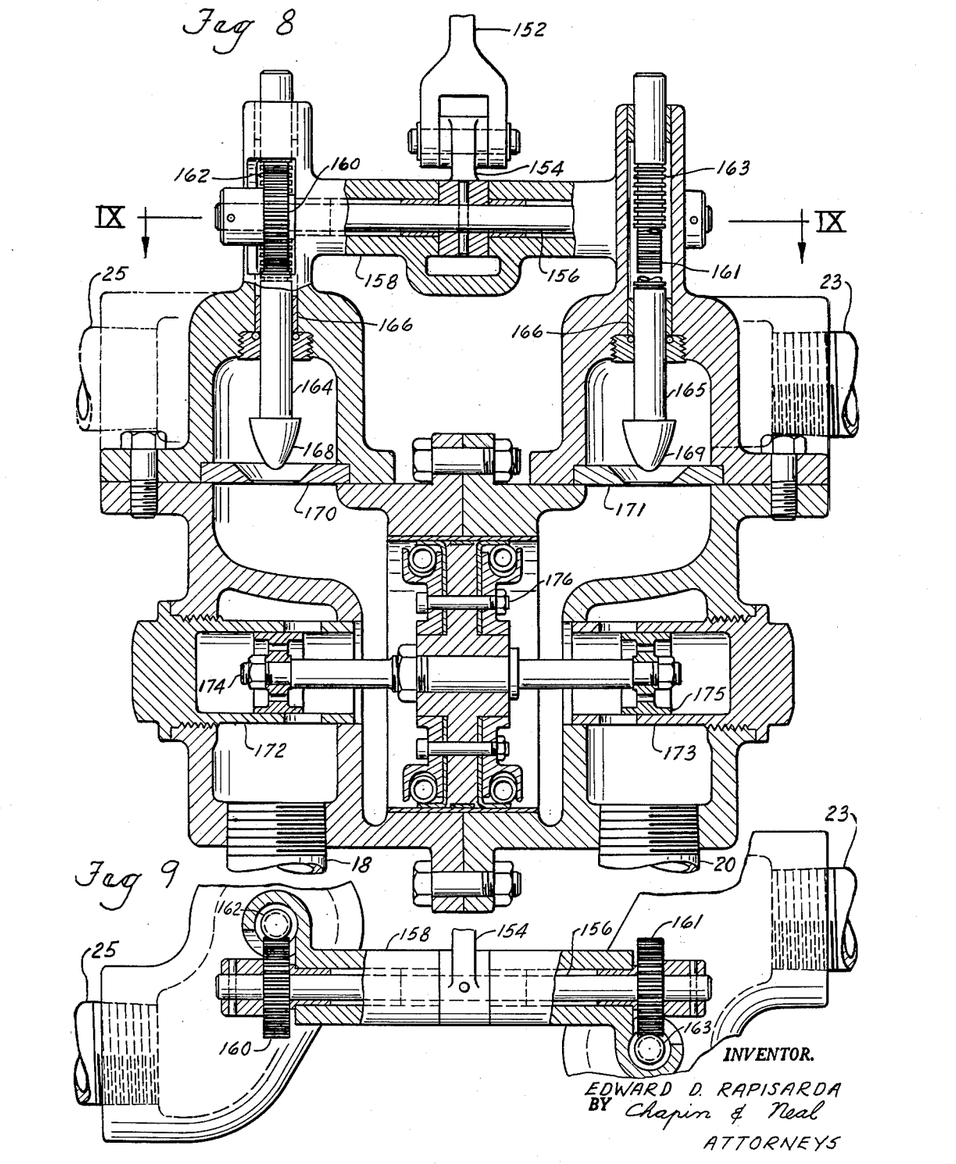
FIG. 8 is a vertical section of blending mechanism seen in FIG. 1.
FIG. 9 is a section taken generally on line IX—IX in FIG. 8.

Referring again to FIG. 1, it will be seen that the crankarm 48 which is moved by the grade selector 46, is operatively connected to the blending means 22 by a link 152. In FIGS. 8 and 9 it will there be seen that the link 152 is connected at its lower arm to a lever 154. The lever 154 is pinned to a shaft 156 which is journaled in a bracket 158. Gears 160, 161 are secured to opposite ends of the shaft 156 and mesh with racks 162, 163 formed on pungers 164, 165 respectively. It will be noted that the racks 162, 163 are disposed on opposite sides of the shaft 156 so that as the arm 154 is moved in a given direction, the plungers 164, 165 will move in opposite directions. The plungers 164, 165 pass through packing glands 166 in the casting 158 and have tapered plugs 168, 169 formed on their lower ends. The plugs 168, 169 are adapted to alternately enter the openings in orifice plates 170, 171 in response to movement of the lever 154. It will be apparent that as the plugs 168 or 169 progressively enter their orifice plates, the flow of liquid therethrough will be diminished and, in fact, either of the plugs 168 or 169 may be effective as a valve to completely prevent the flow of gasoline therethrough.

Regular gasoline from the pipe 18 and premium gasoline from the pipe 20 respectively enter separate chambers in the lower portion of the blendnig device 22. The regular gasoline flows upwardly toward the orifice plate 170, while premium gasoline flows upwardly towards the orifice plate 171. Each type of gasoline passes through ported sleeves 172, 173 respectively which may be variably restricted by movable pistons 174, 175. The pistons 174, 175 are each connected to a central piston 176 which is movable in response to unequal pressures on opposite sides thereof, and in so moving varies the restriction of flow through one or the other of the ported sleeves 172, 173. In this fashion the pressures of the regular and premium gasolines at the orifice plates 170, 171 are at least substantially balanced in accordance with the teachings of U.S. Patent No. 1,985,918. A balance of pressures at the orifice plates 170, 171 has been found preferable in obtaining accurate proportions of regular and premium in any selected grade of gasoline.

As indicated above, each type of gasoline is separately passed through lines 23 and 25 to the meters 24 and 26, respectively. The meters 24 and 26 are of the positive piston displacement type well known to those familiar with the present art.

The integrator unit 32 comprises a gear 180 (FIG. 10) secured to the output shaft of the meter 24 which drives a gear 182 through idler gears 184 and 186. A gear 188 is secured to the output shaft of the meter 26 and drives a gear 190 through an idler gear 192. The gears 182 and 190 are connected to the differential drive 32 and output shaft 34. The rate of rotation of the shaft 34 additively reflects the rates of rotation of the shafts of the meters 24 and 26 and thus rotates in a fixed ratio to the total rate at which gasoline is being dispensed.

Figure 10:
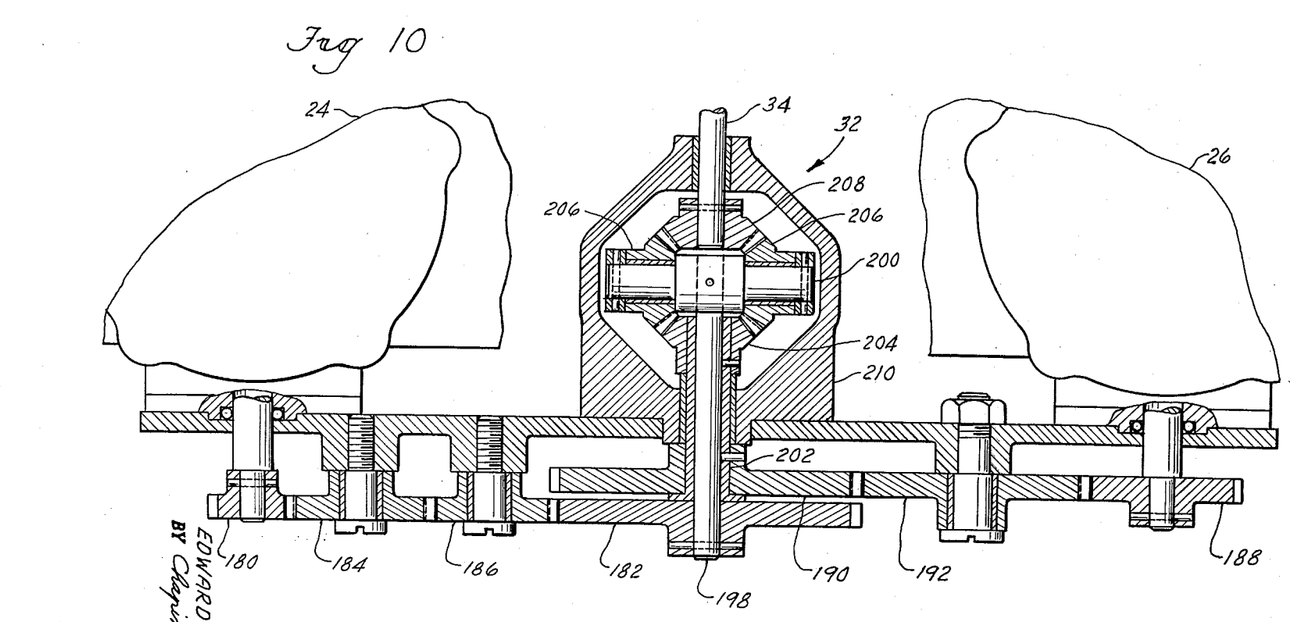
FIG. 10 is a vertical section of integrating means seen in FIG. 1.
Figure 11:
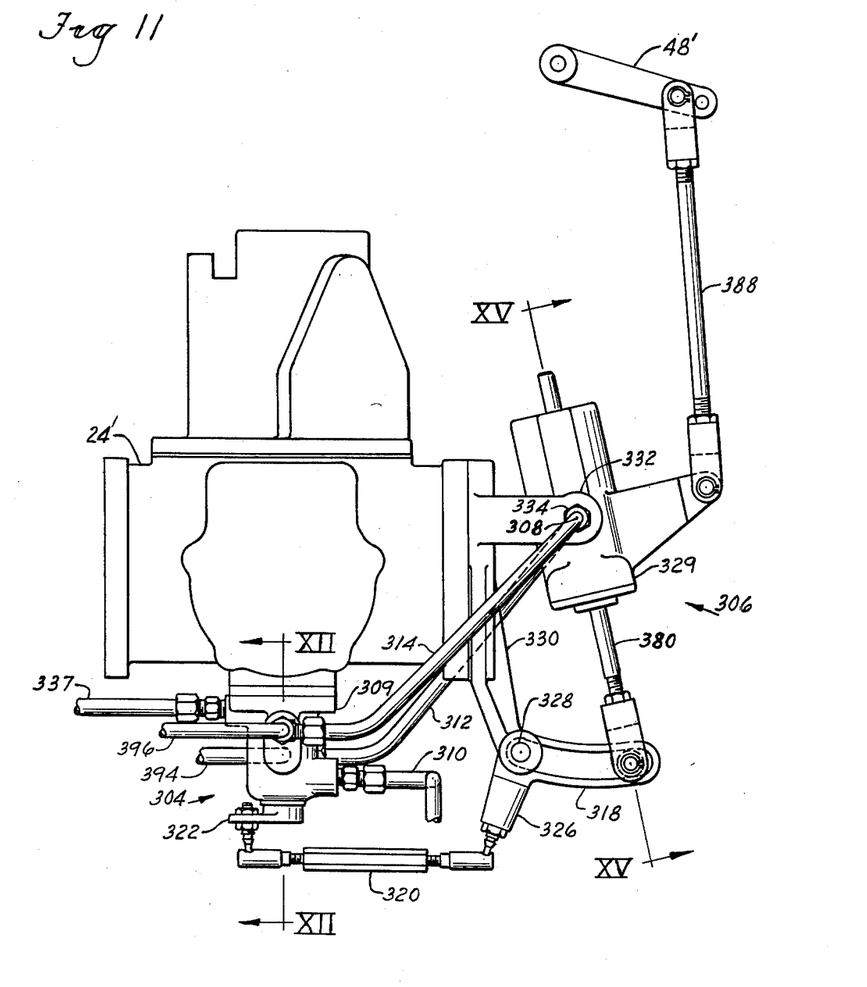
FIG. 11 is a detailed elevation of the blending mechanism seen in FIG. 2.
Figure 12:
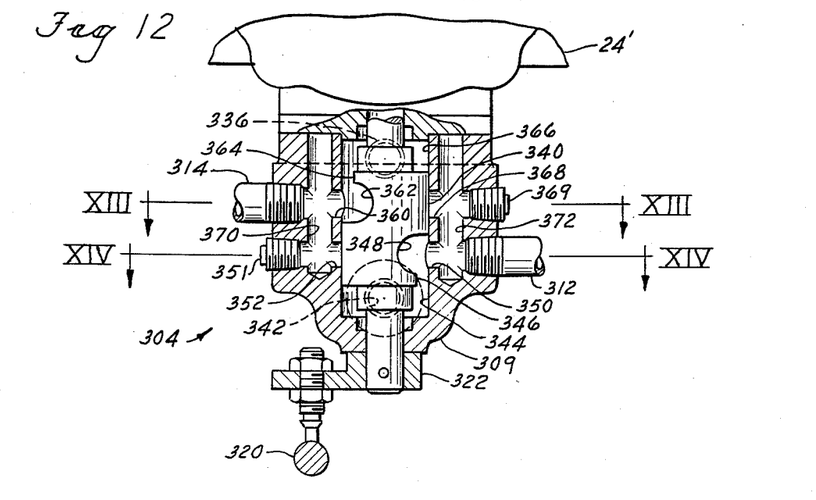
FIG. 12 is a section, on an enlarged scale, taken on line XII—XII in FIG. 11.
Figure 13:
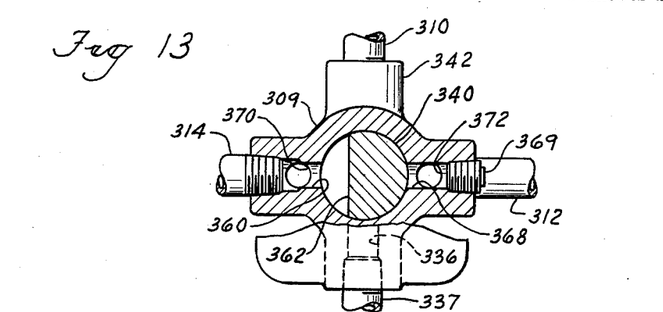
FIG. 13 is a section taken generally on line XIII—XIII in FIG. 12.
Figure 14:
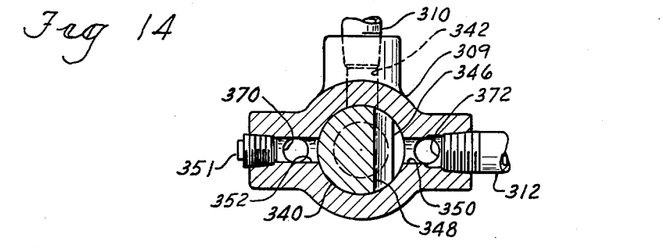
FIG. 14 is a section taken on line XIV—XIV in FIG. 12.
Figure 15:
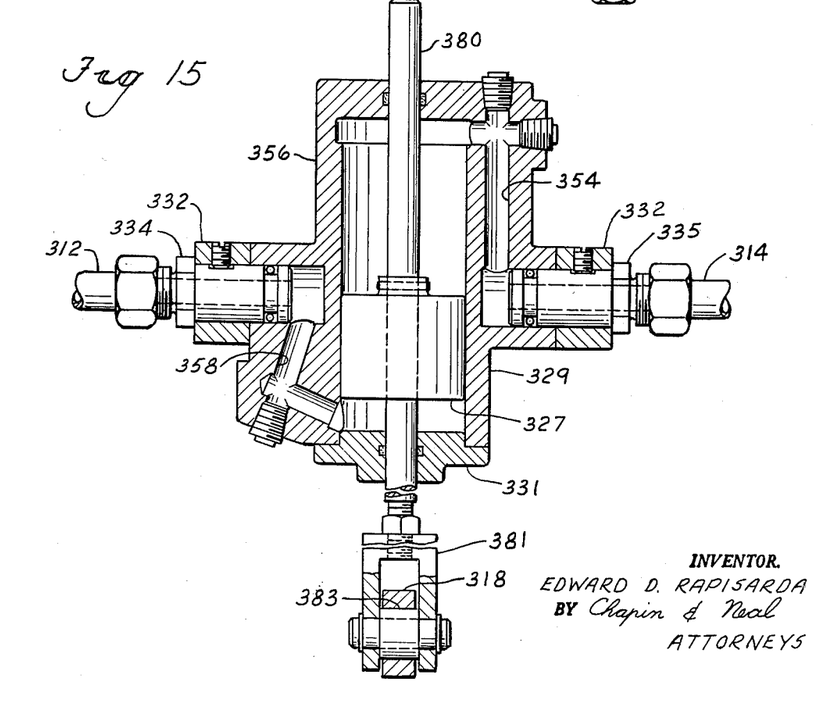
FIG. 15 is a section, on an enlarged scale, taken on line XV—XV in FIG. 11.
Figures 16, 17:
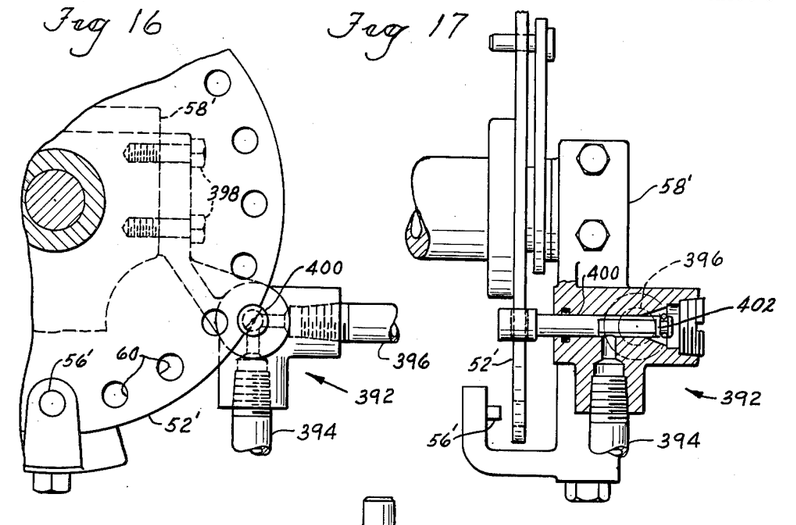
FIG. 16 is a fragmentary section, on an enlarged scale, taken on line VII—VII in FIG. 3 and showing a bypass valve not seen in FIG. 3.
FIG. 17 is an elevation, partly in section, of the valve seen in FIG. 16.

More specifically, the gear 182 is secured to a shaft 198 which is pinned to the cross pintles 200 of the differential drive. The gear 190 is secured to a sleeve 202. A gear 204 is secured to the upper end of the sleeve 202 and meshes with gears 206 journaled on the pintles 200. The gears 206 mesh with a gear 208 secured to the lower end of the shaft 34. The shaft 34 and the sleeve 202 are journaled in a fixed housing 210 while the shaft 198 is journaled in the sleeve 202.

The output drive 34 of the integrator 32 is connected to the variator 36 and drives the latter in the manner described in my above-designated application.

From the above description, it will be apparent that by rotating handle 42, the variator adjusting means (comprising gear segment 64) and the grade selector means 46 are operated simultaneously so that when the blend device 22 is set by one of the dogs 98 and the several interlocks are in position for dispensing a certain grade of gasoline, the variator will then automatically compute a correct total cost for the selected grade of gasoline. If it is desired to change the established unit price for any given grade of gasoline, this is done merely by shifting the position of the particular dog 98 representing that grade of gasoline for which the price change is being made. Once the dog is shifted, the gear segment 64 will be rotated a greater or lesser amount until that dog is brought into meshing relationship with pinion 104. The dispensing unit will then be operative for the delivery of that particular grade of gasoline.

It will be noted that dogs 98 are matched with reference to the indicia 90 of disk 80, as indicated in FIG. 4, so as to locate them readily for a desired unit price for each grade. It will also be noted that the dogs at 98a and 98b (FIG. 3) instead of having two teeth, each have one tooth and a stop. The stops of these dogs at 98a and 98b thus provide limits of rotative movement of the rim or drum 92 relative to pinion 104 and are used to represent the highest and lowest prices, respectively, of the grades of gasoline to be dispensed. The dogs can, of course, be positioned on the drum 92 as desired except that dog 98a cannot be positioned at a lower location than at the indicium representing the lowest unit price of which the variator is capable of calculating. Likewise dog 98b cannot be shifted beyond the indicium indicating the upper limit of prices available on the drum.

Dog 98a will usually represent a grade of gasoline constituting 100% "regular" gasoline. Dog 98b will represent the grade of gasoline usually comprising 100% of "premium" gasoline. The intermediate dogs 98 represent various selected prices of percentages of these two grades of gasoline, such as 50%, 75%/25%, and 25%/75%.

Frequently it may be desirable to have fixed increments between each of the unit prices of the various grades of gasoline. For example, 100% "regular" gasoline may sell for 26 cents a gallon, while the next grade comprising 75% "regular" and 25% "premium" gasoline would sell for 28 cents, etc. Accordingly, if a price increase is made in the unit costs of both regular and premium gasoline, the dogs 98 may be collectively moved the same angular distance relative to the disk 80. To do this, the nut 102 (FIG. 4) is merely backed off, allowing the rim 92 to be pulled clear of lug 86 and then rotated to bring the bench mark 96 into alignment with the indicia 90 which indicates the new price of the basic or regular grade of gasoline.

The unit price of the grade of gasoline being delivered is also indicated on register wheels 210 (FIG. 1) which are mechanically connected to the shaft 44. More specifically, and as can be seen in FIGS. 3 and 4, this mechanical connection takes the form of a bevel gear 212 secured to the shaft 54 and meshing with bevel gears 214, 216. Gear 214 is secured to a forwardly extending shaft 218 and through meshing gears 220 drives the register wheels 210 in the known fashion wherein each successive register wheel to the left of the right hand wheel 210 rotates 1/10 of a revolution for each full revolution of the adjacent wheel so that the price of the gasoline is indicated in 10's, units and 10ths of a cent. The bevel gear 216 is connected to a shaft 222 which extends to and drives similar register wheels on the opposite side of the dispensing unit.

Means are also provided for indicating the particular grade of gasoline dispensed. These means may take the form seen in FIG. 1, wherein a disk 224 is mounted so that successive numbers thereon may be brought into alignment with an opening 226 in the dial face of the dispensing unit. The disk 224 is suitably mounted for rotation about a fixed axis and has a pulley 228 around which is trained a chain 230. The chain 230 passes around and is driven by a pulley 232 on the shaft 112, as is best seen in FIG. 4.

Rotation of the operating handle 42 thus not only operates the grade selecting device 46 to establish the grade of gasoline dispensed and adjusts the variator 36 to compute the unit price of the selected grade, but also it causes the unit price to be displayed by the register wheels 210 and the selected grade of gasoline to be displayed through the opening 226 in the dial face of the dispensing unit.

Reference is next made to FIGS. 2 and 11–17 for a description of a dispensing unit which employs the same grade selecting means and the same variator adjusting means operated by the handle 42 to deliver blends of gasoline and oil. Primed reference characters are employed to identify elements common to both embodiments.

Figure 2:
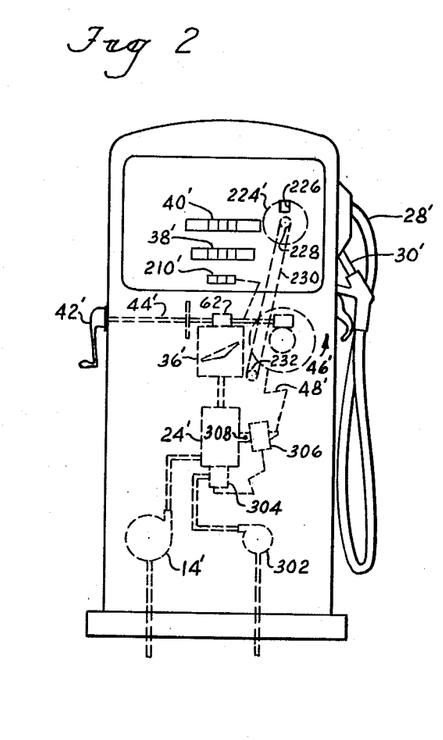
FIG. 2 is an elevation diagrammatically showing a liquid dispensing apparatus embodying an alternate form of the invention and which is particularly suited for the delivery of selected grades of gasoline and oil.

Referring to FIG. 2 in particular, gasoline is drawn from an underground supply tank by a pump 14' and then passes through a meter 24'. From the meter 24' the gasoline passes through lines (not shown) to a delivery hose 28' and is discharged from a nozzle 30' in the usual fashion. A variator 36' measures the flow of gasoline through the meter 24' and drives register wheels 38' to indicate the volume of gasoline dispensed, and register wheels 40' to indicate the cost of the grade of gasoline and oil dispensed. A pump 302 draws oil from a supply reservoir (not shown) and pressurizes it for delivery to a valve 304. From the valve 304 the oil passes to a metering piston unit 306 and afterwards the metered amount of oil passes through a line (not shown) to and through the delivery hose 28' for delivery from the nozzle 30'. As will later appear, the metering piston unit 306 is connected to a control element 48' which is included in the grade selector 46'. Rotation of an operating handle 42' results in movement of the control member 48' which in turn controls the angular relationship of the metering pump unit 306 about a fixed pivot point 308. The angular position of the metering pump 306 determines the quantity of oil which will be discharged from the nozzle 30' in accordance with the grade of oil-gasoline blend which has been selected. The grade of oil-gasoline blend selected will be indicated by the position of a disk 224' and the price of that grade will be indicated by numeral wheels 210'.

Reference is next made to FIGS. 11–14 for a detailed description of the valve 304. The function of this valve is to direct pressurized oil to the metering piston unit 306 and then to pass a measured amount of oil from the metering unit 306 to the dispensing nozzle 30'.

The valve 304 comprises a housing 309 secured to the underside of the meter 24'. Pressurized oil from the pump 302 enters the housing 309 through a line 310. From the valve 304 oil passes to and from the metering piston unit 306 through lines 312, 314. A rotary valve spool 340 is journaled within the housing 309 and is connected to an extension of the output shaft (not shown) of the meter 24' for continuous rotation in fixed relation to the delivery of gasoline. During part of the rotation of valve spool 340 oil flows toward the metering unit 306 through line 312 and towards the valve 304 through line 314. During another position of the rotation of valve spool 340, oil flows in opposite directions through the lines 312 and 314, respectively.

More specifically oil passes from line 310 through a port 342 (FIGS. 12 and 14) into a chamber 344 at the base of the spool 340. The spool 340 is relieved at 346 and 348 so oil may flow from the chamber 344 through either of ports 350, 352 depending upon the rotational position of the spool 340. The line 312 is connected directly to the port 350, while the port 352 is closed by a plug 351.

In the illustrated position of spool 340 oil will flow through line 312 towards the metering unit 306. Also at this time a metered amount of oil will flow from metering unit 306, through the line 314, towards the valve 304. The metered amount of oil flows through a port 360 (FIGS. 12 and 13) to a chamber 366, the spool 340 being relieved at 362 and 364 for this purpose. From the chamber 366 the metered amount of oil passes through a port 336 to a line 337. The line 337 leads to the hose 28' and nozzle 30'. The reliefs 362, 364 in spool 340 also provide for flow of a metered amount of oil to the chamber 366 from a port 368, the outer end of which is closed off by a plug 369.

The ports 350, 368 are connected by a vertical passageway 372, while the ports 352, 360 are connected by a vertical passageway 370. Thus, when the spool 340 rotates 180° from its illustrated position (and even before that time) oil will flow from line 310, chamber 344, to port 352 (FIG. 12), through passageway 370 to line 314 towards the metering unit 306. At this time a metered amount of oil will flow from the metering unit 306 through line 312, passageway 372, port 368 to chamber 366 and thence to line 337 and the nozzle 30'. Flow of oil through the lines 312, 314 is thus reversed during each rotation of the valve spool 340.

The metering piston unit 306 comprises (FIGS. 11 and 15) a piston 327 which rides in a cylinder 329. The cylinder 329 is mounted for rotation on trunnions 334, 335 for pivotal movement about the axis 308, mentioned above. The trunnions 334, 335 are supported by arms 332 projecting from a bracket 330 which is mounted on the meter 24'. The line 312 is connected to the trunnion 334 and communicates, through a hole therein and passageway means 358, with the lower end of the cylinder 329. The line 314 is connected to the trunnion 335 and communicates, through a hole therein and passageway means 354, with the upper end of the cylinder 329.

The piston 327 is secured to a rod 380 which passes through holes in the upper end of the cylinder 329 and an end cap 331 closing off the lower end of the cylinder. The rod 380 has a clevis 381 secured to its lower end and embracing a lever 318 and a clevis pin or roller 383 passing through an arcuate slot formed in said lever. The lever 318 is pivotally mounted on a pin 328 carried by bracket 330. A leg 326 extends from the arm 318 and is connected by a link 320 to an arm 322. The arm 322 is secured to the lower end of the valve spool 340 and thus is rotated by the meter 24'.

With gasoline passing through the valve 24' the valve spool 340 will rotate and the slotted lever 318 will oscillate in fixed relation to the amount of gasoline being delivered. These movements are so timed that when the spool 340 rotates to first permit flow of oil to the metering unit 306 through line 312, the arm 318 has just started to move upwardly, as would be the case in the illustrated position of valve spool 340. A metered amount of oil is displaced by upward movement of the piston 327 and is forced through line 314 and valve 304 to line 337. After approximately 180° of rotation the valve spool 340 seals the ports 350 and 360 and opens ports 352 and 368 for the next 180° of rotation. At approximately the time the ports 352, 368 are opened, the lever 318 begins its downward movement. Pressurized oil now flows through line 314 to the upper end of the cylinder 329 while a metered amount of oil is discharged therefrom through the line 312 back to the valve 304 and the line 337. It will be appreciated that the piston 327 is displaced within the cylinder 329 primarily by the pressurized oil alternately flowing through the lines 312, 314 to the top and bottom of the piston. The primary function of the arm 318 is to limit the stroke of the piston 327 and thereby control the metered amount of oil discharged from the metering unit 306. Movement of the lever 318 is always synchronized so as to be working in the same direction as the oil pressure on the piston 327. In this way a minimum work load is imposed on the gasoline meter 24'.

As brought out above, the stroke of piston 327 controls the amount of oil which will be discharged from the metering unit 306 and thus the amount of oil additive in the gasoline. In turn the stroke of the piston 327 is dependent on the location of the clevis 381 (attached to piston rod 380) along the length of the lever 318. This positional relationship is varied by pivoting the cylinder 329 on trunnions 334, 335 in response to movement of the crank arm 48' which is connected to the cylinder 329 by a rod 388. The crank arm 48' is of course oscillated by the grade selector unit 46' (FIG. 2) in the manner previously described to select a desired grade of fuel. The farther the clevis 382 is disposed from the pin 328, the greater the amount of oil added, while no oil will be added when the axis of clevis roll 383 is coincident with the axis of oscillation of the lever 318. The slot in lever 318 continues behind the arm 326 to permit this adjustment so that gasoline alone may be dispensed if desired.

It is preferable that the slot in lever 318 be generated about a radius swung from the axis of trunnions 334, 335 when the lever 318 is midway between its extreme limits of oscillation. With this arrangement the piston 327 will move an equal distance from its midposition in any angular setting of cylinder 329 except, of course, there is no movement of the piston when clevis roll 383 is disposed on the axis of oscillation of lever 318.

Whenever the grade selector 46' is operated to swing the cylinder 329, the piston 327 is moved relative thereto unless the lever 318 happens to be in its illustrated midposition. In any other position of the lever 318, oil must be displaced from one side to the other of piston 327. To insure free and easy adjustment of the cylinder 329, bypass means provides for the free flow of oil between opposite ends of the cylinder whenever the operating handle 42' is being rotated to operate the grade selector 46', as will now be explained with reference to FIGS. 11, 16 and 17.

Lines 312, 314 are respectively connected to opposite sides of a valve 392 (FIG. 16) by lines 394, 396. The valve 392 is secured to the bracket 58' by screws 398 in adjacent relation to the index disk 52'. The valve 392 comprises a stem 400 which is slotted to receive the index disk 52' in a manner permitting free rotation of said plate. The stem 400 is thus axially movable with the disk 52'. Whenever the plate 52' is displaced (as in FIG. 17) clear of the pin 56', the valve stem 400 is shifted axially and a sealing member 402 is displaced from the seat therefor, thereby permitting free flow of oil between the lines 394, 396 in either direction. The cylinder 329 can then be angularly adjusted with a minimum of effort. When the plate 52' is again seated on pin 56', for operation of the dispensing unit, the valve 392 is closed and oil is metered by the unit 306 in the manner described above.

Both embodiments of the invention are controlled by the single operating handle 42 or 42' to select the grade of fuel to be dispensed, with the added provision of the variator 36 or 36' being simultaneously adjusted to compute the cost of the selected grade of fuel which will be shown on the cost register wheels.

Having thus described the invention, what is claimed as novel and desired to be secured by Letters Patent of the United States is:

1. A liquid dispensing unit including means for delivering different grades of liquid comprised of predetermined portions of a first and a second liquid, said means including separate lines through which the two liquids flow, an orifice plate interposed in each line, a tapered plug movable into and out of the opening in each orifice plate to separately control the flow of each liquid, means for simultaneously moving said plugs in opposite directions with one plug being withdrawn from its associated orifice plate as the other plug is being inserted into its associated orifice plate, register means for indicating the cost of liquid delivered, metering means having a single output, a variator driven by the single output of the metering means and having an adjustable output drivingly connected to the register means, means for adjusting the output of the variator to correspond to the unit price to the grade of liquid selected, means for selecting a desired grade of liquid, said selecting means including a control member movable to a plurality of predetermined positions, said control member being operatively connected to said plug moving means whereby the latter will be responsive to movement of the control member to said predetermined positions in which positions the plugs will control flow of the two liquids to establish the predetermined portions of said first and second liquids for the various grades, and common means for simultaneously operating said selecting means and said variator adjusting means so that the register means will automatically indicate the cost of any grade of liquid delivered and at the established unit price therefor.

2. A dispensing unit as in claim 1 wherein the metering means comprise a meter interposed in each of the liquid lines on the discharge side of the orifice plate therein and an integrator provided with an input connection from each meter, said integrator having an output drivingly connected to said variator.

3. A liquid dispensing unit including means for delivering different grades of liquid comprising predetermined portions of a first and a second liquid, said means comprising a metering piston unit for passing measured quantities of the second liquid, said unit including a cylinder and a piston riding therein and means for varying the amount of said measured quantities including means for adjusting the stroke of said piston, register means for indicating the cost of liquid delivered, metering means for said first liquid having a single output, a variator driven by the output of the metering means for the first liquid and having an adjustable output drivingly connected to the register means, means for adjusting the output of the variator to correspond to the unit price of the grade of liquid selected, means for selecting a desired grade of liquid, said selecting means including a control member movable to a plurality of predetermined positions, the stroke adjusting means of said metering piston unit being responsive to movement of said control member to said predetermined positions to establish preselected amounts of the second liquid to be added to the first liquid for the various grades of liquid corresponding to said positions, and common means for simultaneously operating said selecting means and said variator adjusting means so that the register means will automatically indicate the cost of any grade of liquid delivered and at the established unit price therefor.

4. A liquid dispensing unit including means for delivering different grades of liquid comprised of predetermined portions of a first and a second liquid, said means comprising a line through which the first liquid is delivered, a second line through which the second liquid is delivered, a valve interposed in said second line, a double-acting metering piston unit including a cylinder and a piston movable therein, means including said valve for alternately directing the flow of said second liquid to opposite ends of said cylinder and directing metered quantities of said second liquid discharged from said cylinder back to said second line to the discharge side of said valve, and means for limiting the stroke of said piston to vary the quantity of second liquid discharged from said metering unit, register means for indicating the cost of liquid delivered, metering means for the first liquid having a single output, a variator driven by the output of the first liquid metering means and having an adjustable output drivingly connected to the register means, means for adjusting the output of the variator to correspond to the unit price of the grade of liquid selected means for selecting a desired grade of liquid, said selecting means including a control member movable to a plurality of predetermined positions, said means for limiting the stroke of the piston of the second liquid metering unit being responsive to movement of said control member to said predetermined positions to establish preselected amounts of the second liquid added to the first liquid for the various grades corresponding to said positions of the control member, and common means for simultaneously operating said selecting means and said variator adjusting means so that the register means will automatically indicate the cost of any grade of liquid delivered and at the established price therefor.

5. A dispensing unit as in claim 4 wherein the metering piston unit and the valve are both operatively connected to the first liquid metering means with the operation of the valve synchronized with the movement of the metering piston so that the second liquid is always free to flow into and out of said cylinder.

6. A liquid dispensing unit including means for delivering different grades of liquid comprised of predetermined portions of a first and a second liquid, register means for indicating the cost of liquid delivered, metering means having a single output, a variator driven by the single output of the metering means and having an adjustable output drivingly connected to said register means, said variator including a rotatable member and means for infinitely adjusting the variator output in response to variations in the angular position of said rotatable member, means for rotating said rotatable member to adjust the output of the variator to correspond to the unit price of the grade of liquid selected, means for selecting a desired grade of liquid, said means comprising a drum and a control member movable to predetermined positions in response to rotation of said drum, said grade delivering means being response to movement of said control member to said positions to establish the portions of first and second fluid preselected for the grades of liquid corresponding to the positions of said control member, and a common operating handle for simultaneously rotating said drum and the rotatable member of said variator so that the register means will automatically indicate the cost of any grades of liquid delivered and at the established unit price therefor.

7. A dispensing unit as in claim 6 wherein means are provided for rendering the dispensing unit operative for the delivery of liquid only upon rotation of the rotatable member of the variator to incremental positions representing even fractional units at which the price of the liquid will be computed.

8. A liquid dispensing unit as in claim 6 wherein a pinion is provided and the control member is movable in response to rotation of the pinion, and further wherein dogs in the form of gear teeth segments are adjustably secured about the periphery of the drum for meshing engagement with said pinion whereby the dogs can be angularly disposed on the drum to incrementally rotate the pinion and thus move the control member to said predetermined positions in predetermined relation to the operation of the variator adjusting means to thereby establish the desired unit prices for the various grades of liquid.

9. A dispensing unit as in claim 8 wherein the drum comprises a disk and a rim attached thereto with the dogs adjustably secured to said rim, and further wherein means are provided for rotating said rim and the dogs mounted thereon relative to said disk to thereby vary the unit price for all of said grades of liquid without varying the price increments therebetween.

10. A liquid dispensing unit as in claim 6 wherein a cam and index member are intermittently rotated in response to rotation of said drum and movement of the control member is controlled by said cam, and further wherein interlock means including said index member are provided for rendering the dispensing unit operative only when the control member is accurately moved to one of said predetermined positions so that accurate portions of first and second liquid in each grade will be assured.

11. A dispensing unit is in claim 10 wherein the register means comprise a cam rotatable in order to reset the register, means are provided responsive to rotation of said register cam for rendering the dispensing unit operative, and further wherein the interlock means comprise means for preventing rotation of said register cam, linkage means connected to said preventing means and response to movement of said index member for rendering the preventing means inoperative when said control member is moved by said first-named cam to one of said predetermined positions.

12. A dispensing unit as in claim 6 wherein numeral wheels are provided for indicating the unit price of the grade of liquid being delivered, and means operated by said common operating handle are provided for rotating said numeral wheels to positions indicating the unit price rate of the variator corresponding to the angular position of the rotatable member thereof, and further wherein other indicia means are operatively connected to said drum to indicate the grade of liquid being dispensed corresponding to the position to which the control member is moved.

13. A dispensing unit as in claim 4 wherein metering means are provided in the first liquid line and further wherein the metering piston unit and the valve are both operatively connected to said first liquid metering means with the operation of the valve synchronized with the movement of the metering piston so that the second liquid is always free to flow into and out of said cylinder.

14. A dispensing unit as in claim 13 wherein the cylinder is pivotally mounted about an axis transverse to the stroke of the piston, a lever is pivotally mounted about an axis parallel to the first-named axis and spaced from one end of the cylinder, said piston having a rod projecting from said cylinder and connected to said lever, and wherein means connected to said first liquid metering means are provided for oscillating said lever to so synchronize the valve for free flow of the second liquid and further wherein means are provided for pivoting the cylinder and adjusting the distance between the pivotal axis of the lever and the point of connection of the piston rod thereto to vary the stroke of the piston and the amount of second liquid to be delivered, as desired.

15. A dispensing unit as in claim 14 wherein a line interconnects the opposite ends of said cylinder, a normally closed valve is interposed in said interconnecting line and means are provided for automatically opening the last-named valve whenever the cylinder is being pivoted to vary the amount of second liquid to be delivered.

References Cited in the file of this patent
UNITED STATES PATENTS

| | | |
|---|---|---|
| 2,743,843 | Bliss | May 1, 1956 |
| 2,795,359 | Lehman | June 11, 1957 |
| 2,880,908 | Young | Apr. 7, 1959 |
| 2,885,119 | Carriol | May 5, 1959 |
| 2,886,211 | McGaughey et al. | May 12, 1959 |